UNITED STATES PATENT OFFICE.

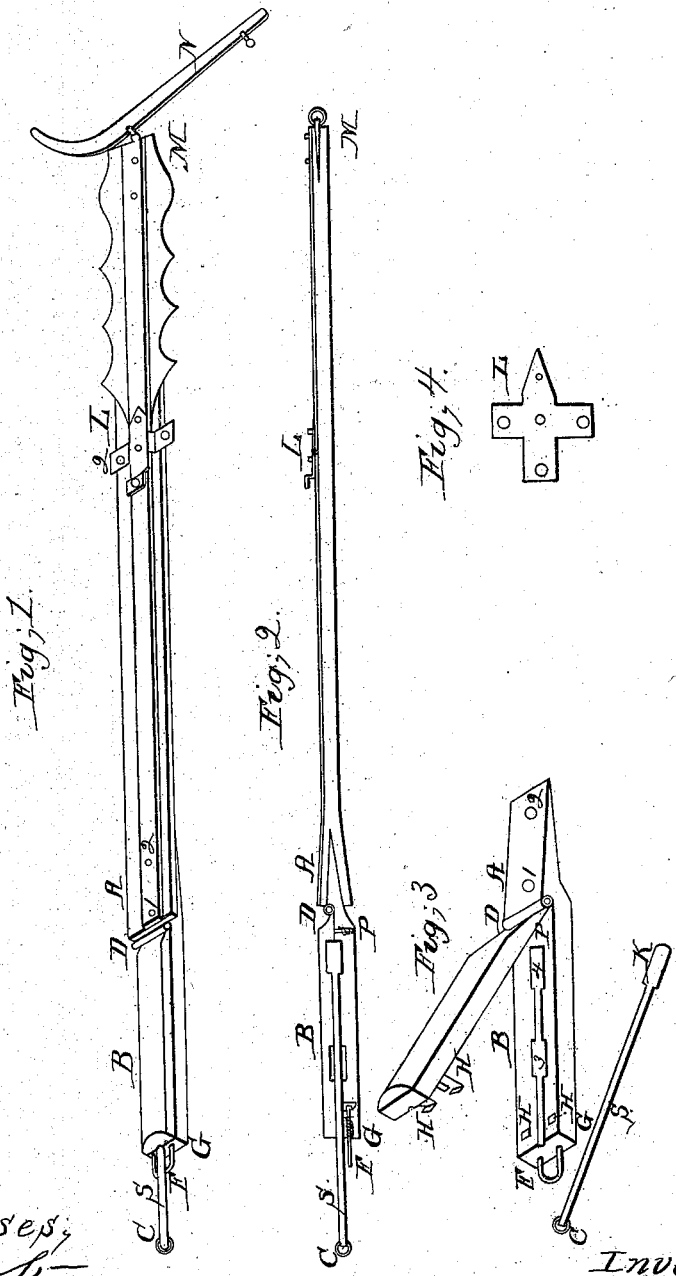

WILLIAM KOSS, OF McGREGOR, IOWA.

IMPROVED TRACE-FASTENING.

Specification forming part of Letters Patent No. 35,454, dated June 3, 1862.

*To all whom it may concern:*

Be it known that I, WILLIAM KOSS, of McGregor, Clayton county, State of Iowa, have invented a new and Improved Mode of Constructing Harness-Traces; and I do hereby declare that the following is a full and exact description thereof, reference being had to the accompanying drawings and to the letters of reference marked thereon.

The nature of my invention consists in providing the trace with an adjustable double spring-joint trace-plate in which a revolving loop and rod work with a shoulder sunk in the plate-pieces for shortening or lengthening the trace.

To enable others skilled in the art to make and use my invention, I will proceed to describe its construction and operation.

I construct the trace in any of the known forms and attach it at the hame in the ordinary way.

My invention will be understood by referring to the annexed diagram.

At the point B, Figure 1, is an adaptable double spring-joint trace-plate with a revolving loop and rod working with a shoulder sunk in the plate-pieces for the purpose of shortening and extending the trace. The action of this part is seen by reference to Fig. 3. The trace is attached to the plate at the points 1 and 2. Place the revolving rod S so that the point A may rest in the socket at 4, then press down the lid of the plate turning on the hinge D, so that the hooks H H are caught by a spring-catch at $h\ h$, and the rod at point A will be firmly held in the socket at 4. The case will then appear as at B, Fig. 1. Now, in Fig. 1, pull the hook F, which is held by a spiral spring, until the hooks H H (seen in Fig. 3) are released from the catches $h\ h$, when a spring, P, Fig. 3, throws up the lid, releasing the revolving rod from the socket 4. Now draw the head of the rod A from socket 4 to socket 3 and press down the lid, as before, and the trace is lengthened by the distance from 4 to 3.

The eye C, Fig. 1, can be attached to the whiffletree like the ordinary cockeye, while the revolving rod can be pressed into or drawn out of the case B, as occasion requires.

Fig. 4 represents the looped plate attached to the trace at L, Fig. 1, for the purpose of sustaining the belly-band, back-pad, and side straps, thus leaving the trace entire and uniform between the points M and D.

Fig. 1 represents the trace in condition for use; Fig. 2, an edge view of same.

The benefits claimed for my invention are as follows, to wit: First, it dispenses with the trace-buckle; second, it facilitates the adjustment of the trace; third, it obviates the necessity of cutting the trace when the horse is down; fourth, the horse may be instantly detached from the carriage when he becomes unmanageable by pulling a cord attached to F, Fig. 1; fifth, it leaves the trace entire, uniform in strength, and simple, giving the trace additional strength.

The case B may be made of any proper metal.

What I claim as my invention, and desire to secure by Letters Patent is—

The adjustable trace-fastening consisting of the double spring-plate B, hinged at D, the rod S, and springs F and P, all constructed and arranged as herein described and set forth.

WILLIAM KOSS.

Witnesses:
   J. T. STONEMAN,
   E. L. KING.